United States Patent [19]

Prinz et al.

[11] Patent Number: 4,799,303

[45] Date of Patent: Jan. 24, 1989

[54] METHOD OF MAKING A VALVE SLEEVE

[75] Inventors: Thomas K. Prinz, St. Clair Shores; Stephen A. Dier, Fraser, both of Mich.

[73] Assignee: TRW Inc., Lyndhurst, Ohio

[21] Appl. No.: 89,599

[22] Filed: Aug. 26, 1987

[51] Int. Cl.$^4$ ............................................ B21D 53/10
[52] U.S. Cl. .................................. 29/157.1 R; 29/557; 72/370
[58] Field of Search .................. 29/157.1 R, 557, 558; 72/370, 341

[56] References Cited

U.S. PATENT DOCUMENTS

| | | |
|---|---|---|
| 1,422,655 | 7/1922 | Brehmer . |
| 1,870,970 | 8/1932 | Stevenson . |
| 2,737,831 | 3/1956 | Webb ................................ 72/341 X |
| 4,419,877 | 12/1983 | Alfano . |
| 4,535,519 | 8/1985 | Kajikawa et al. . |
| 4,543,813 | 10/1985 | Rogers ............................. 72/370 X |
| 4,614,014 | 9/1986 | Ferguson . |
| 4,689,864 | 9/1987 | Fukuma et al. ................ 29/157.1 R |

Primary Examiner—Howard N. Goldberg
Assistant Examiner—Irene Cuda
Attorney, Agent, or Firm—Tarolli, Sundheim & Covell

[57] ABSTRACT

A method of manufacturing a valve sleeve including the steps of providing a tubular member having a plurality of grooves extending axially along an inner surface of the tubular member through a pair of axially opposite end surfaces of the tubular member. The end surfaces extend radially outward from an inner surface of the tubular member to an outer surface. Each of the axially extending grooves have a base surface located between the inner and outer surfaces. The method also includes forcefully abutting a first punch against at least one of the end surfaces between the base surface of each groove and the outer surface to displace material of the end surface adjacent each groove radially inwardly of the inner surface. The method also includes then forcefully abutting a second punch against the displaced material of the end surface which extends radially inwardly of the inner surface and moving a portion of the displaced material axially and radially outwardly to form a seal land at an end of each groove.

12 Claims, 3 Drawing Sheets

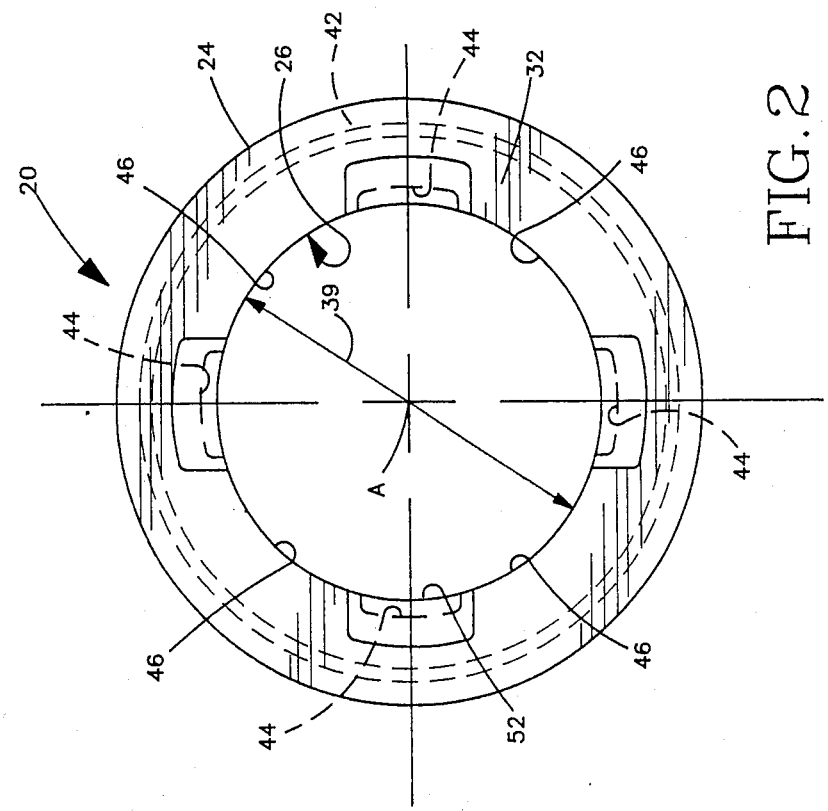
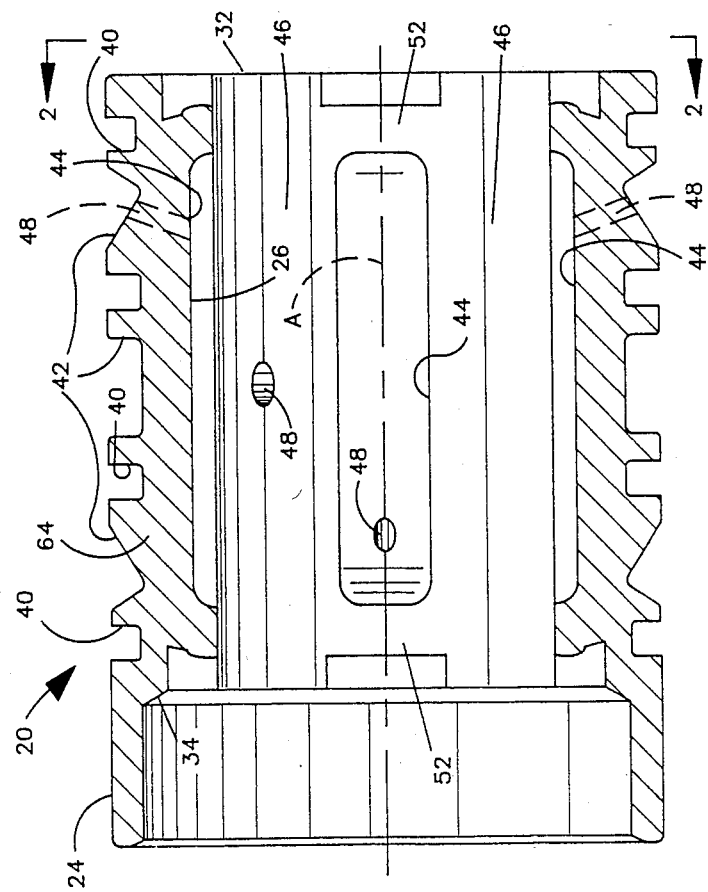
FIG. 2
FIG. 1

METHOD OF MAKING A VALVE SLEEVE

BACKGROUND OF THE INVENTION

1. Technical Field

The present invention relates to a method of manufacturing a valve sleeve, and particularly to a method of manufacturing a valve sleeve for use in a hydraulic power steering gear of a vehicle.

2. Description of the Prior Art

A hydraulic power steering gear for a vehicle includes a valve sleeve and valve core located coaxially within the valve sleeve. Upon relative rotation between the valve sleeve and valve core, fluid flow is directed from a power steering pump through the valve core and valve sleeve (i) to one of a pair of fluid assist chambers in a power assist motor and (ii) from the other one of the pair of fluid assist chambers of the power assist motor to a reservoir.

The valve sleeve typically has a plurality of axially extending grooves in an inner surface of the valve sleeve. Adjacent axially extending grooves in the inner surface are separated by an axially extending land. Each of the grooves are closed at axially opposite ends by seal lands of the valve sleeve. The seal lands have a radius equal to the radius of the axially extending lands. The seal lands have a close fit with the valve core to restrict axial flow of fluid from between the valve sleeve and valve core.

Methods of making valve sleeves are disclosed in U.S. Pat. Nos. 4,419,877 and 4,614,014. In U.S. Pat. No. 4,419,877 a tubular member is provided having a plurality of axially extending grooves in its inner surface. The grooves extend completely through the axially opposite end surfaces of the tubular member. The ends of the grooves are closed by bringing punches having concave faces into forceful engagement with the opposite axial end surfaces of the tubular member. Material is displaced radially inwardly by the punches to form a continuous annular bead of material at each axial end surface of the tubular member. The displaced material extends radially inwardly of the inner surface of the valve sleeve and closes the ends of the grooves. A portion of the displaced material is then machined away to establish the finished diameter of the inner surface of the valve sleeve and the axial extent of the seal lands.

In U.S. Pat. No. 4,614,014 a tubular member is provided having a plurality of axially extending grooves in its inner surface. The grooves extend completely through axially opposite end surfaces of the tubular member. An annular groove is machined in the each of end surfaces of the tubular member radially outwardly of the inner surface of the tubular member. A tool forcefully engages a wall of each annular groove to displace material of the end surfaces radially inwardly. The displaced material extends radially inwardly of the inner surface of the tubular member. The tool engages and displaces material only in an area adjacent each groove. The sleeve is then bored to remove portions of the displaced material and to establish the finished diameter of the inner surface of the valve sleeve and the axial extent of the seal lands.

The seal lands on the valve sleeves made according to these known methods are formed by (i) displacing material of the valve sleeve radially inwardly and (ii) removing a portion of the displaced material by machining. Thus, the seal land area has an axially extending dimension which results from these steps.

SUMMARY OF THE INVENTION

The present invention is directed to a method of manufacturing a valve sleeve for use in a vehicle fluid power steering gear. A valve sleeve made according to the method of the present invention has a relatively large seal land surface area. Thus, a relatively large resistance to fluid leakage between the valve sleeve and valve core is achieved.

The method of manufacturing a valve sleeve in accordance with the present invention includes the steps of providing a tubular member having a plurality of grooves extending axially in an inner surface of the tubular member. The grooves extend completely through axially opposite end surfaces of the tubular member. The end surfaces extend radially outwardly from the inner surface of the tubular member to an outer surface. Each of the grooves have a base surface located between the inner and outer surfaces. A first punch is brought into engagement against at least one of the end surfaces of the tubular member. The first punch forcefully engages the one end surface between the base surface of each groove and the outer surface of the tubular member. The first punch then displaces material of the one end surface adjacent each groove radially inwardly beyond the inner surface. Preferably, a pair of first punches are moved axially toward the tubular member to simultaneously engage both of the end surfaces of the tubular member to close the opposite ends of each groove.

A second punch is then brought into engagement with the displaced material which extends radially inwardly of the inner surface. The second punch moves a portion of the displaced material radially outward and axially to form a seal land. Preferably, a pair of second punches are moved axially within the valve sleeve to simultaneously engage the displaced material at both of the end surfaces to form the seal land areas at the ends of the grooves.

The first punch has a plurality of projections extending axially from an end face of the punch for engaging the end surface of the tubular member. The number of projections corresponds to the number of grooves in the tubular member. Each respective projection engages only a portion of the end surface immediately adjacent each respective groove. The second punch has a tapered portion which engages the displaced material to move the displaced material radially and axially as the punch is moved axially within the valve sleeve. Since the second punch moves the displaced material axially and radially, the axial length of the seal land at the groove ends is larger than the axial length would be if the displaced material was merely machined away to form the seal land. Thus, the present invention provides a valve sleeve having a relatively large seal land surface area for restricting axial fluid flow from between the valve sleeve and valve core.

BRIEF DESCRIPTION OF THE DRAWINGS

Further features of the present invention will become apparent to those skilled in the art to which the present invention relates from reading the following specification with reference to the accompanying drawings, in which:

FIG. 1 is an enlarged longitudinal cross sectional view of a valve sleeve made according to the method of the present invention;

FIG. 2 is an end elevational view taken along line 2—2 of FIG. 1;

DESCRIPTION OF A PREFERRED EMBODIMENT

Figure 3:
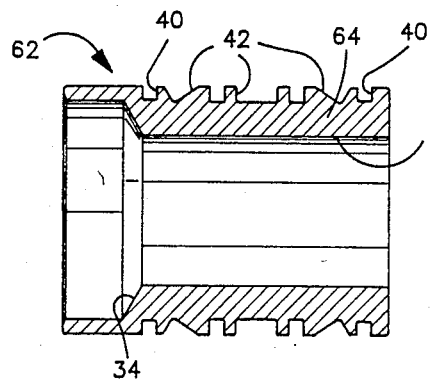
FIG. 3 is a longitudinal cross sectional view of a valve sleeve bank.

A finished valve sleeve 20 made according to the method embodying the present invention is illustrated in FIGS. 1 and 2. The valve sleeve 20 has an outer surface 24 and an inner surface 26. The valve sleeve 20 also has a pair of radially extending end surfaces 32, 34. The end surfaces 32, 34 extend from the inner surface 26 to the outer surface 24. The inner surface 26 has a finished diameter represented by the numeral 39.

A plurality of annular grooves 42 are formed in the outer surface 24 of the valve sleeve 20. The annular grooves 42 allow fluid communication of the valve sleeve 20 with a hydraulic power steering gear housing (not shown), as is known. The annular grooves 42 extend circumferentially around the outer surface 24 and are axially spaced along the valve sleeve 20. A plurality of annular seal grooves 40 are also formed in the outer surface 24 of the valve for receiving a seal (not shown) to block fluid leakage between adjacent annular grooves 42.

A plurality of axially extending grooves 44 are formed in the inner surface 26 of the valve sleeve 20. Adjacent grooves 44 are separated by a respective one of a plurality of axially extending lands 46. A plurality of radially extending passages 48 connect the annular grooves 42 with the inner surface 26 of the valve sleeve 20 and grooves 44 for fluid communication, as is known. A pair of seal lands 52 are located at axially opposite end portions of the valve sleeve 20.

The seal lands 52 extend circumferentially along the inner surface 26 of the valve sleeve 20. The axially extending lands 46 and seal lands 52 are arcuate surfaces having the same diameter as the diameter 39 of the inner surface 26. The axially extending lands 46 cooperate with axially extending lands on the valve core, as is known. Such cooperation between the lands selectively blocks and allows fluid flow through the grooves 44 of the valve sleeve 20 upon relative rotation between the valve core and valve sleeve. The seal lands 52 have a close fit with the outer circumference of the valve core to restrict fluid flow axially outward from the ends of the grooves 44. While only four grooves 44 and four lands 46 are used in the valve sleeve 20, it should be apparent that a different number of grooves and lands could be used depending on the application of the valve sleeve.

In order to manufacture the finished valve sleeve 20, a valve sleeve blank 62 (FIG. 3) is provided. The valve sleeve blank 62 is formed from a metal tubular member 64. Preferably, the annular grooves 42, passages 48 and seal grooves 40 are already machined in the valve sleeve blank 62.

Figure 4:
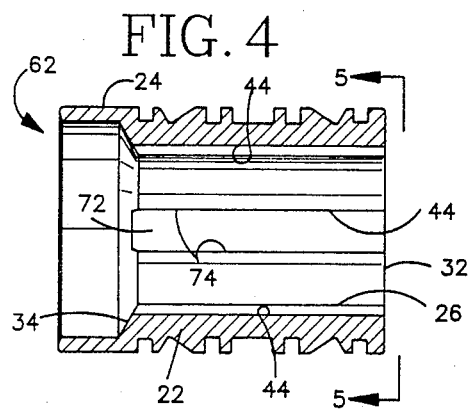
FIG. 4 is a longitudinal cross sectional view of the valve sleeve blank of FIG. 3 having axially extending grooves formed therein.
Figure 5:
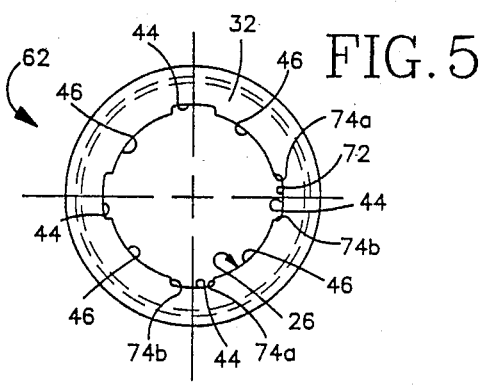
FIG. 5 is an end elevational view taken along the line 5—5 of FIG. 4.

The valve sleeve blank 62 is placed in a fixture (not shown). The valve sleeve blank 62 is then broached to form the plurality of grooves 44 in the inner surface 26, as illustrated in FIGS. 4 and 5. Forming the grooves 44 also defines the locations of the axially extending lands 46.

Each of the grooves 44 extend axially and completely through the end surfaces 32, 34. Each of the grooves 44 has a base surface 72 and a pair of generally parallel side surfaces 74a, 74b. The base surface 72 of the groove 44 is located between the inner surface 26 and the outer surface 24.

Figure 6:
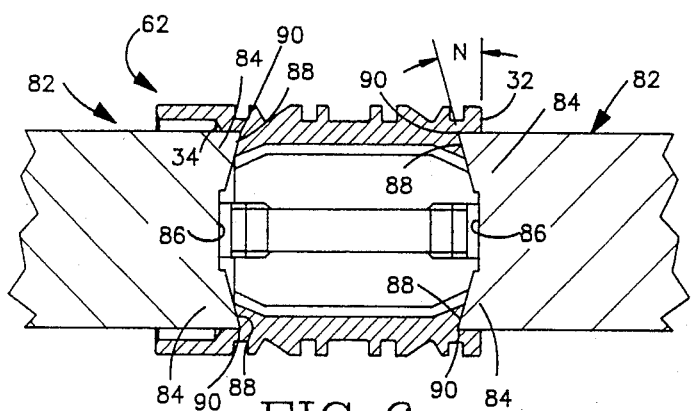
FIG. 6 is a longitudinal cross sectional view of the valve sleeve blank engaged by a pair of first punches.
Figure 7:
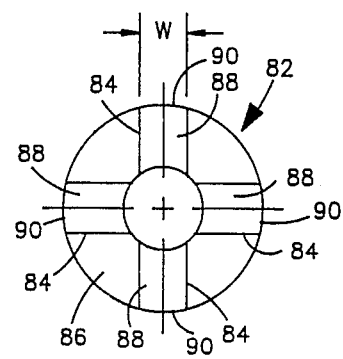
FIG. 7 is an end view of one of the punches of FIG. 6.

A pair of first punches 82 (FIGS. 6 and 7) is then moved axially into forceful engagement with the end surfaces 32, 34 of the valve sleeve blank 62. Each of the pair of first punches 82 has a plurality of projections 84 extending from an end face 86. Each of the projections 84 has a planar surface 88 for engaging an end surface 32, 34 of the valve sleeve blank 62. The number of projections 84 extending from the end face 86 of each of the first punches 82 corresponds to the number of grooves 44 in the valve sleeve blank 62. Four projections 84 are shown extending from the end face 86 of each of the first punches 82. The valve sleeve blank 62 is indexed relative to the punch 82 so that each of the projections 84 is axially aligned with a respective groove 44.

Each of the projections 84 has a width W which is slightly greater than the width of a respective groove 44. The width of a groove 44 is defined by the distance between the side surfaces 74a, 74b (FIG. 5) of the groove. Thus, each of the projections 84 has a width W which permits the projection to engage only material of the end surfaces 32, 34 immediately adjacent and axially aligned with the ends of each of the grooves 44.

The planar surface 88 of each of the projections 84 is disposed at an angle N into the direction of movement of the first punches 82 as they move axially toward a valve sleeve blank 62. The angle N is such that the radial outermost portion or leading edge 90 of the planar surface 88 will be the first portion of the projection 84 to engage the end surfaces 32, 34 of the valve sleeve blank 62. Each leading edge 90 shears a portion of the material from the valve sleeve blank 62 as the projections 84 are advanced into the end surfaces 32, 34. The planar surfaces 88 are angled rearwardly relative to the direction in which the first punch 82 is advanced. Thus, the material 92 engaged by a projection 84 (FIG. 8) is forced radially inwardly along the planar surface 88 as the first punch 82 advances, until the material is displaced a sufficient distance to extend radially inwardly of the inner surface 26. Thus, the first punches 82 displace material 92 radially inwardly only adjacent each end of the grooves 44. The displaced material 92 closes the ends of the grooves 44.

Since the pair of first punches 82 displace only the material adjacent the ends of the grooves 44, there is a minimal risk of deforming the valve sleeve blank 62 as compared to the process disclosed in U.S. Pat. No. 4,419,877. After the ends of the grooves 44 are closed, the first punches 82 are then removed from engagement with the end surfaces 32, 34 of the valve sleeve blank 62.

Figure 8:
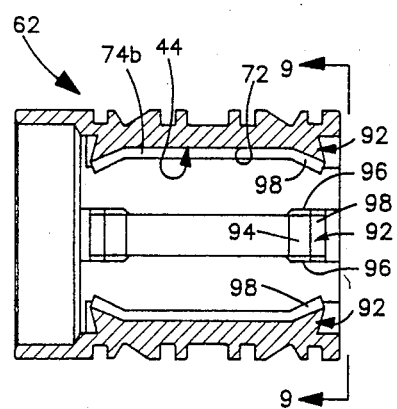
FIG. 8 is a longitudinal cross sectional view of the valve sleeve blank after engagement with the pair of first punches.
Figure 9:
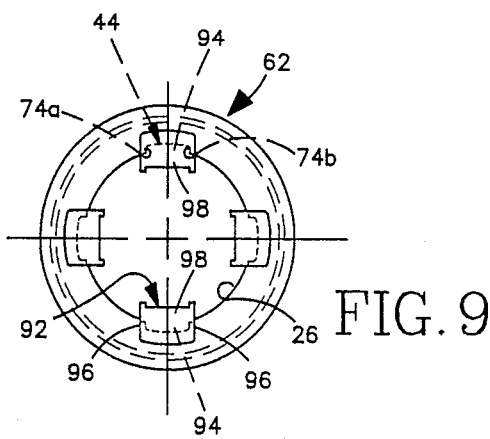
FIG. 9 is an end elevational view taken along line 9—9 of FIG. 8.

The material 92 which is displaced from the end surfaces 32, 34 of the valve sleeve blank 62 by the pair of first punches 82, as viewed in FIGS. 8 and 9, is made up of three components. The three components of the displaced material 92 include material 94 adjacent the base 72 of each groove 44, material 96 adjacent each of the side surfaces 74a, 74b of each groove, and material 98 projecting radially inwardly of the inner surface 26.

Figure 10:
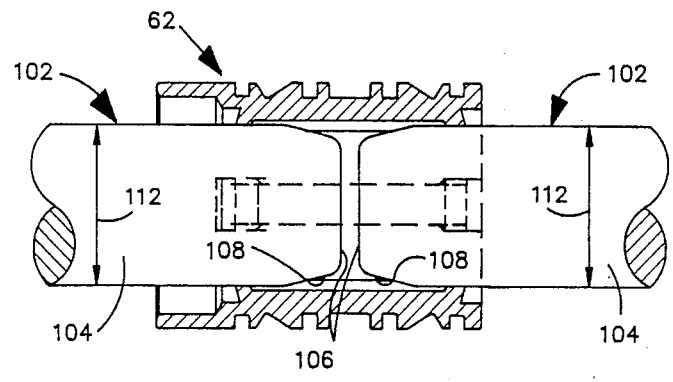
FIG. 10 is a longitudinal cross sectional view of the valve sleeve blank engaged by a pair of second punches.

After the pair of first punches 82 is removed, a pair of second punches 102 (FIG. 10) acts on the valve sleeve blank 62. The second punches 102 are moved axially towards one another and into the opposite ends of the valve sleeve blank 62. The second punches 102 engage the portions 98 of the displaced material 92 which extends radially inwardly of the inner surface 26 to form the seal lands 52 at the ends of the grooves 44. Each of the second punches 102 has a generally cylindrical body portion 104 of a diameter 112 and an end 106. The cylindrical body portion 104 and end 106 are joined by a tapered frustoconical surface 108.

Figure 11:
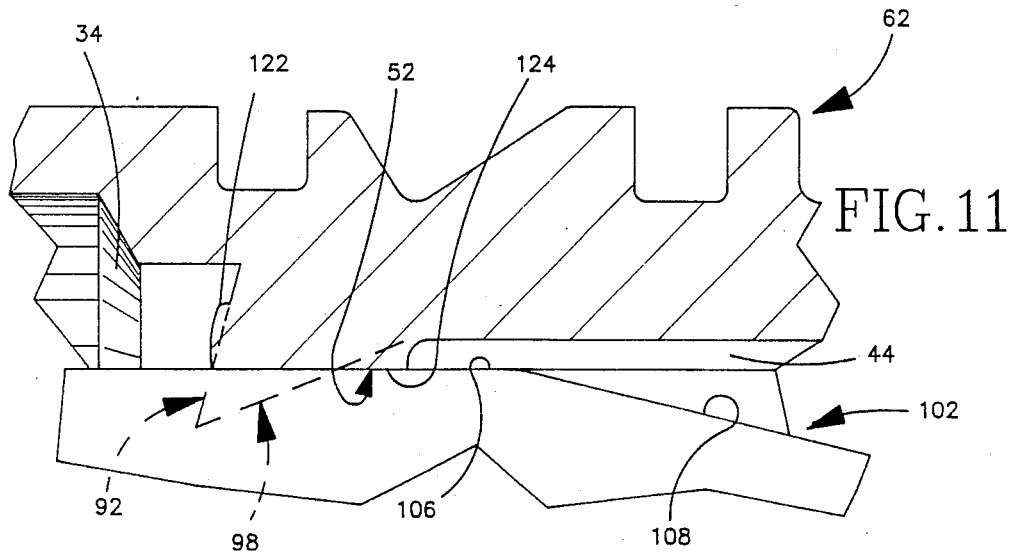
FIG. 11 is an enlarged view of a portion of FIG. 10 illustrating how material of the valve sleeve blank is displaced by one of the pair of second punches.

As the punches 102 are axially moved within the valve sleeve blank 62, the displaced material 98 is engaged by the tapered frustoconical surface 108. As the punches 102 are axially advanced, the displaced material 92 is forced radially outwardly and axially of valve sleeve blank 62. The displaced material 98, indicated by the dashed lines in FIG. 11, is forced along the tapered frustoconical surface 108 as the punch 102 is axially advanced within the valve sleeve blank 62. The displaced material 98 is forced radially outwardly by the tapered frustoconical surface 108 of the second punch 102 to form an outer end portion 122 of the seal land 52. The tapered frustoconical surface 108 of the second punch 102 also forces the displaced material 98 axially into the groove 44 of the valve sleeve blank 62 to form an inner end portion 124 of the seal land 52. This results in providing a relatively large seal land axial length as compared to the prior art which would machine off the displaced material 98.

The cylindrical body portion 104 of the punches 102 has an outer diameter 112 which is substantially equal to the finished diameter 39 of the inner surface 26 of the finished valve sleeve 20 (FIGS. 1 and 2). After the second punches 102 act on the valve sleeve 62, the inner diameter 39 of the valve sleve blank may then be broached and honed to a final size and finish to provide the finished valve sleeve 20 of FIG. 1.

From the above description of a preferred embodiment of the invention, those skilled in the art will perceive improvements, changes and modifications. Such improvements, changes and modifications within the skill of the art are intended to be covered by the appended claims.

Having described a preferred embodiment of the present invention, we claim:

1. A method of manufacturing a valve sleeve comprising the steps of:
providing a tubular member having a plurality of grooves extending axially along an inner surface of the tubular member through a pair of axially opposite end surfaces of the tubular member, each of the end surfaces extending radially outwardly from an inner surface of the tubular member to an outer surface, each of the grooves having a base surface located between the inner and outer surfaces;

abutting a first punch against at least one of the end surfaces between the base surface of each groove and the outer surface to displace material of the end surface adjacent each groove radially inwardly of the inner surface; and then abutting a second punch against the displaced material of the end surface extending radially inwardly of the inner surface and moving a portion of the displaced material along the longitudinal axis of said member and radially outwardly to form a seal land at an end of each groove.

2. The method set forth in claim 1 wherein said step of abutting a first punch further includes simultaneously forcefully abutting a pair of first punches against the axially opposite end surfaces to displace material of the end surfaces adjacent each groove radially inwardly of the inner surface.

3. The method set forth in claim 2 wherein said step of abutting a second punch further includes simultaneously forcefully abutting a pair of second punches against the displaced material at the end surfaces simultaneously to move a portion of the displaced material along the longitudinal axis of said member and radially outwardly to form seal lands at axially opposite ends of each groove.

4. The method set forth in claim 1 wherein said step of abutting a first punch includes moving the first punch axially towards the end surface of the tubular member and into forceful engagement with the end surface, the first punch including a body portion having an axial end face, a plurality of projections extending axially from the end face for engaging the end surface of the tubular member, the number of projections corresponding to the number of axially extending grooves in the tubular member, each of the plurality of projections having a planar surface wider than a respective groove for engaging the end surface of the tubular member and which planar surface is disposed at an acute angle the direction of movement of the first punch towards the tubular member with a leading edge disposed adjacent the outermost edge of the first punch.

5. The method set forth in claim 1 wherein said step of abutting the second punch includes moving the second punch axially within the tubular member into forceful engagement with the displaced material, the second punch being formed with a body portion having an outer diameter substantially equal to the diameter of the inner surface of the tubular member, an end having a diameter smaller than the diameter of the inner surface, and a tapered portion connecting the end and the body portion.

6. The method set forth in claim 1 wherein said step of abutting a second punch includes moving a portion of the displaced material radially outwardly to a diameter which is substantially equal to the diameter of the inner surface of the tubular member.

7. A method of manufacturing a valve sleeve comprising the steps of:
forming a plurality of grooves extending axially along an inner surface of a tubular member, which grooves extend through at least one end surface of the tubular member and have a base surface located between the inner surface of the tubular member and an outer surface of the tubular member;

displacing material of the one end surface of the tubular member adjacent each of the plurality of grooves radially inwardly to close the ends of the grooves and to locate a portion of the material radially inwardly of the inner surface; and thereafter, moving at least a portion of the displaced material located radially inwardly of the inner surface radially outwardly and along the longitudinal axis of said member to form a seal land at the one end of each groove.

8. The method set forth in claim 7 wherein said step of forming a plurality of grooves includes holding the tubular member in a fixture in a predetermined orientation and moving a broach axially within the tubular member in engagement with the inner surface.

9. The method set forth in claim 7 wherein said step of displacing material includes simultaneously displacing material of axially opposite end surfaces of the tubular member.

10. The method set forth in claim 7 wherein said step of displacing material includes moving a first punch axially into forceful engagement with the end surface of the tubular member, the first punch including a plurality of projections extending axially therefrom, each of the plurality of projections having a width greater than the width of a respective groove for displacing material adjacent the respective groove.

11. The method set forth in claim 7 wherein said step of moving a portion of the displaced material includes simultaneously moving portions of displaced material of axially opposite end surfaces of the tubular member radially outwardly and along the longitudinal axis of said member.

12. The method set forth in claim 7 wherein said step of moving a portion of the displaced material includes moving a second punch axially within the tubular member to forcefully engage a portion of the displaced material and move the portion of the displaced material radially outwardly and axially, the second punch including a tapered surface for progressively moving the engaged portion of the displaced material radially outwardly and along the longitudinal axis of said member as the second punch is axially moved within the tubular member.

* * * * *

UNITED STATES PATENT AND TRADEMARK OFFICE
CERTIFICATE OF CORRECTION

PATENT NO. : 4,799,303

DATED : January 24, 1989

INVENTOR(S) : Thomas K. Prinz

It is certified that error appears in the above-identified patent and that said Letters Patent is hereby corrected as shown below:

Column 6, line 1, change "an" to -- the --.

Column 6, line 42, after "angle" insert --to --.

Signed and Sealed this

Twenty-seventh Day of June, 1989

Attest:

DONALD J. QUIGG

*Attesting Officer*  *Commissioner of Patents and Trademarks*